US010457127B1

(12) United States Patent
Tortorella, Jr.

(10) Patent No.: US 10,457,127 B1
(45) Date of Patent: Oct. 29, 2019

(54) FLEXIBLE SUBSTRATE CONNECTORS (71) Applicant: Frank Joseph Tortorella, Jr., Park Ridge, IL (US)

(72) Inventor: Frank Joseph Tortorella, Jr., Park Ridge, IL (US)

( * ) Notice: Subject to any disclaimer, the term of this patent is extended or adjusted under 35 U.S.C. 154(b) by 0 days.

(21) Appl. No.: 16/449,396

(22) Filed: Jun. 22, 2019

Related U.S. Application Data (63) Continuation of application No. 15/716,208, filed on Sep. 26, 2017, now Pat. No. 10,328,776.

(60) Provisional application No. 62/402,349, filed on Sep. 30, 2016.

(51) Int. Cl.
*B60J 7/10* (2006.01)
*A44B 13/00* (2006.01)
*E04H 15/64* (2006.01)

(52) U.S. Cl.
CPC ........... *B60J 7/104* (2013.01); *A44B 13/0082* (2013.01); *E04H 15/64* (2013.01); *Y10T 428/24008* (2015.01)

(58) Field of Classification Search
CPC ...... B60J 7/104; E04H 15/64; A44B 13/0082; A44B 13/0088
USPC .................................................. 24/459, 460
See application file for complete search history.

(56) References Cited

U.S. PATENT DOCUMENTS

| | | | | | |
|---|---|---|---|---|---|
| 2,266,466 A | * | 12/1941 | Linder | ...................... | A47C 7/22 160/378 |
| 2,604,897 A | * | 7/1952 | Cottor | ...................... | B60J 7/104 135/119 |
| 3,162,920 A | * | 12/1964 | Durham | ................... | A01F 25/13 24/265 R |
| 4,777,071 A | ‡ | 10/1988 | Liu | .................... | A44B 13/0082 428/120 |
| 4,937,108 A | * | 6/1990 | Crisp | ................ | H01L 21/67144 428/13 |
| 5,074,014 A | * | 12/1991 | Freeman | ................. | E04H 15/64 24/476 |

(Continued)

FOREIGN PATENT DOCUMENTS

| CH | 588363 A5 | * | 5/1977 | ............. | B60J 7/104 |
|---|---|---|---|---|---|
| DE | 10244053 A1 | * | 3/2004 | ........... | A44B 13/007 |

(Continued)

*Primary Examiner* — Robert Canfield (57) ABSTRACT

A connector for a flexible substrate includes a first connector piece including a first plurality of through holes, a second connector piece including a second plurality of through holes, the second connector piece disposable in opposition to the first connector piece to align the first plurality of through holes and the second plurality of through holes to define, via the first plurality of through holes and the second plurality of through holes, a grommet, a plurality of first fastener receivers and a plurality of second fastener receivers and a channel, defined at least in part by the first connector piece, extending across the first connector piece. The plurality of first fastener receivers are disposed on a first side of the channel and the plurality of second fastener receivers are disposed on a second side of the channel, the first side of the channel corresponds to a position at which a flexible substrate is disposable between the first connector piece and the second connector piece, and the second side of the channel corresponds to a position at which a flexible substrate is not disposed between the first connector piece and the second connector piece.

20 Claims, 8 Drawing Sheets

(56) References Cited

U.S. PATENT DOCUMENTS

| | | | | |
|---|---|---|---|---|
| 5,117,537 | A * | 6/1992 | Hunter | A47C 21/022 24/455 |
| 5,222,988 | A * | 6/1993 | Riley | A44B 13/0088 16/2.1 |
| 5,315,736 | A * | 5/1994 | Nilsson | B60J 7/104 135/119 |
| 5,415,915 | A * | 5/1995 | Oh | A44B 13/007 135/119 |
| 5,424,107 | A * | 6/1995 | Lee | B68F 1/00 428/137 |
| 5,512,347 | A * | 4/1996 | Chu | A44B 13/0082 135/119 |
| 5,557,830 | A * | 9/1996 | Davis | A44B 99/00 24/113 MP |
| 5,922,432 | A * | 7/1999 | Kalal | E04H 15/64 428/131 |
| 6,124,017 | A ‡ | 9/2000 | Sokol, Jr. | B32B 3/08 428/137 |
| 7,837,164 | B1 ‡ | 11/2010 | Getgood | E04H 15/64 135/120.3 |
| 8,028,381 | B2 ‡ | 10/2011 | Murray | A47H 23/01 160/395 |
| 9,174,518 | B2 * | 11/2015 | Wilson | B60J 7/104 |
| 9,267,517 | B2 * | 2/2016 | Wilson | B60J 7/104 |
| 2008/0000056 | A1 * | 1/2008 | Murray | A47H 23/01 24/460 |
| 2009/0205166 | A1 * | 8/2009 | Murray | A47H 23/01 16/221 |
| 2014/0373316 | A1 * | 12/2014 | Wilson | B60J 7/104 24/459 |
| 2014/0373318 | A1 * | 12/2014 | Wilson | B60J 7/104 24/514 |

FOREIGN PATENT DOCUMENTS

| | | | | |
|---|---|---|---|---|
| FR | 2826552 A1 * | 1/2003 | | A41F 3/02 |
| WO | WO-9502234 A1 * | 1/1995 | | A44B 13/0088 |

\* cited by examiner

‡ imported from a related application

FLEXIBLE SUBSTRATE CONNECTORS

RELATED APPLICATION

This application claims benefit of priority to U.S. Provisional Patent Application Ser. No. 62/402,349, filed on Sep. 30, 2016 and of U.S. patent Ser. No. 15/716,208, filed on Sep. 26, 2017, which is to issue as U.S. Pat. No. 10,328,776 on Jun. 25, 2019, of which this application is a continuation application, each of which is incorporated herein by reference in its entirety.

FIELD OF THE DISCLOSURE

This disclosure relates generally to connectors, and, more particularly, to flexible substrate connectors.

BACKGROUND

Figure 1:
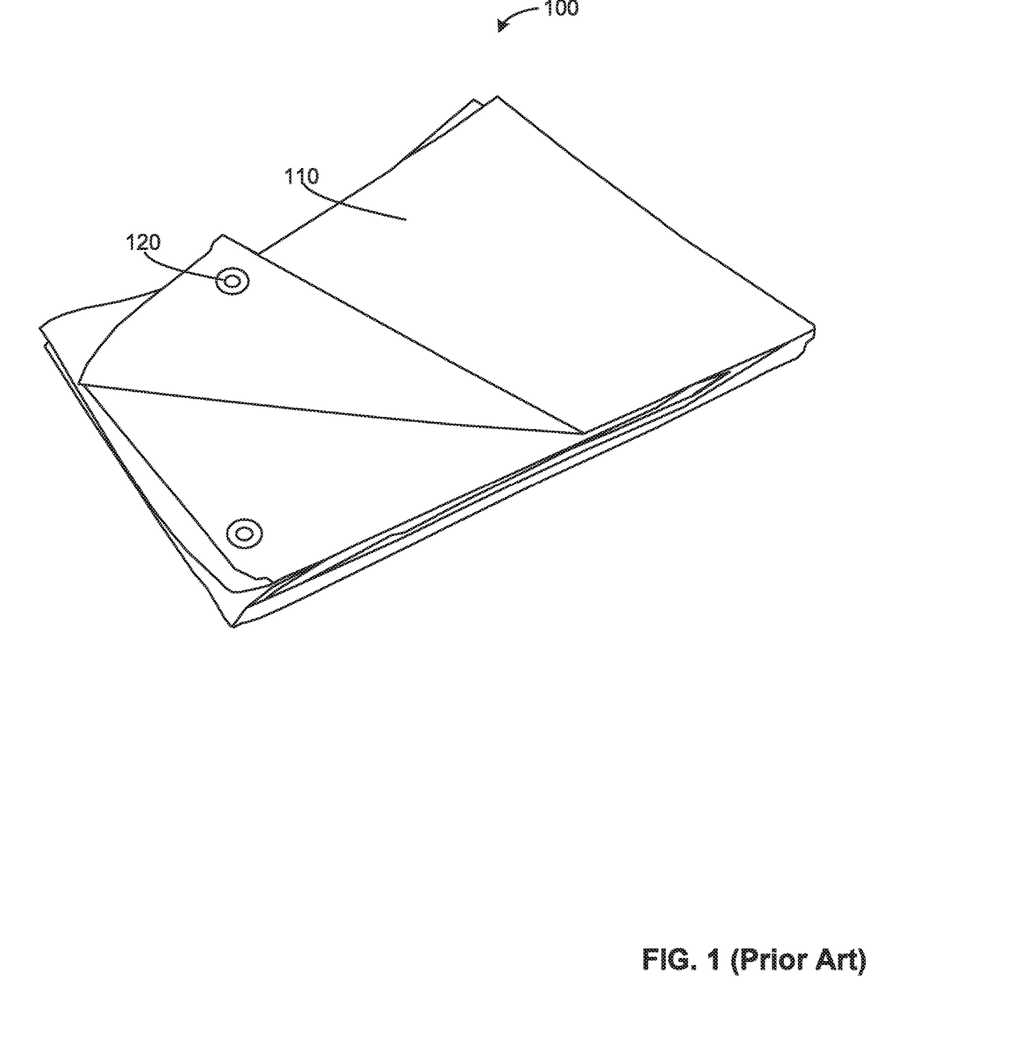
FIG. 1 is a schematic illustration of a known tarp.

FIG. 1 shows a tarpaulin (hereinafter "tarp") 100 comprising a flexible substrate 110, such as canvas, polyester, nylon, vinyl or woven polyethylene. Grommets 120 are formed around a periphery of the tarp 100, such as at the corners and along the sides of the tarp 100, to form attachment points for rope, cord or fittings (e.g., D-loop fitting, PVC coated steel hooks, stainless steel hooks, plastic hooks, "S" hooks, carabiners, etc.) to allow the tarp 100 to be tied down or suspended.

The figures are not to scale. Wherever possible, the same reference numbers will be used throughout the drawing(s) and accompanying written description to refer to the same or like parts. As used in this patent, stating that any part is in any way positioned on (e.g., positioned on, located on, disposed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

As noted above, the tarp 100 of FIG. 1 can be tied down or suspended via rope or cords attached to the grommets 120 formed around a periphery of the tarp 100. However, under large loadings, such as a gust of wind acting upon the large surface area of the tarp 100, forces applied by rope or cord attached to the grommets 120 (e.g., attached directly via a knot or via a fitting) may be sufficient to tear out one or more of the grommets 120, rendering the tarp 100 unsuitable for its intended purpose. Moreover, a loss of one grommet 120 may increase a load borne by the remaining grommets 120 responsive to subsequent loading, potentially increasing forces on the remaining grommets 120 and a potential for failure of additional grommets 120.

Figure 2:
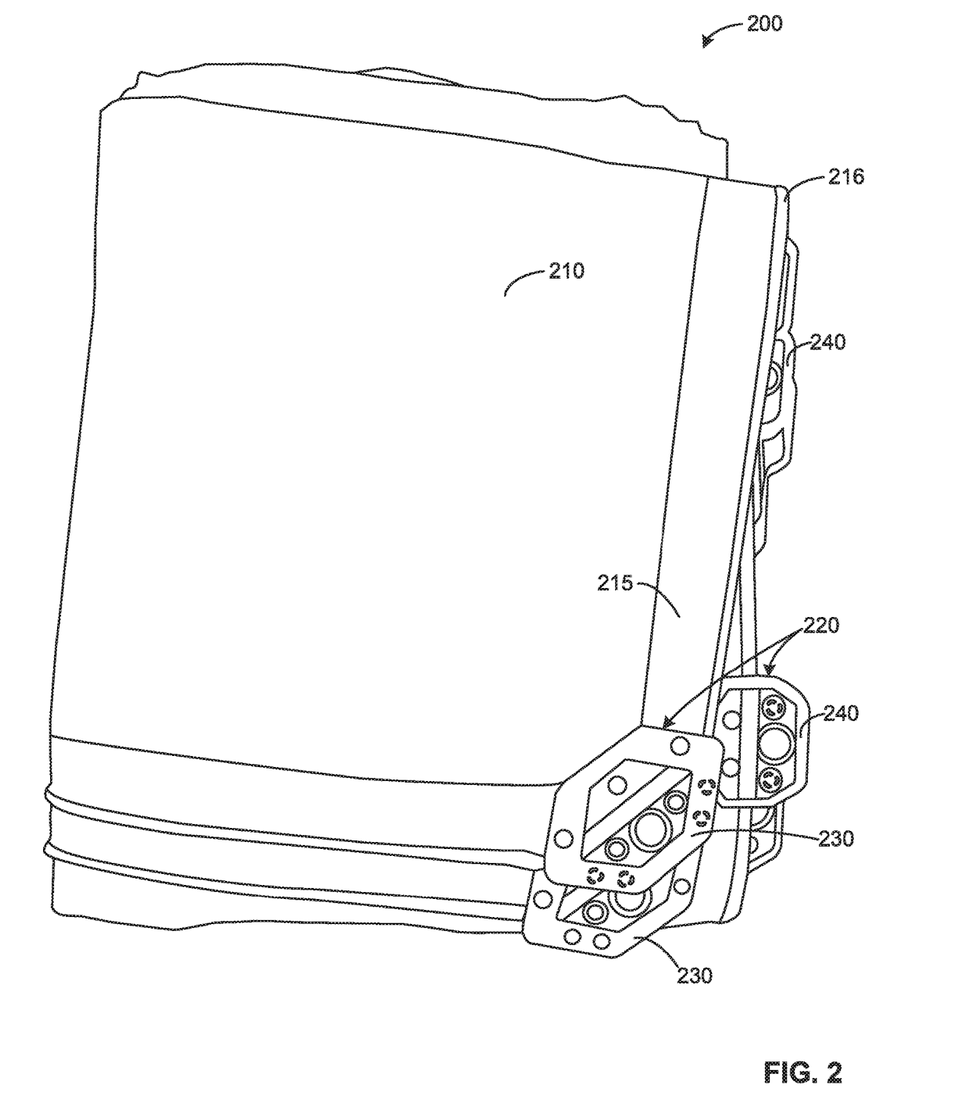
FIG. 2 is a schematic illustration of an example flexible substrate including example connectors constructed in accordance with teachings of this disclosure.

FIG. 2 shows an apparatus, an example tarp 200 as depicted, comprising an example flexible substrate 210. In some examples, the flexible substrate 210 includes canvas, ripstop canvas, polyethylene, polyester, polyester coated with polyurethane, polyester oxford, nylon, nylon 6, nylon 66, nylon coated with polyurethane, ripstop nylon, ripstop fabric, polyvinylchloride and/or vinyl. In some examples, the flexible substrate 210 may include an example reinforced periphery 215 including a reinforcing material 216 (e.g., material applique, an integrated rope, an integrated cable, folded and doubled stitched edges, interwoven high tensile materials, etc.). In other examples, the flexible substrate 210 may include a portion of (e.g., a tab, a strap, tie down, etc.) a tent, a hammock, luggage, a duffle bag, a parachute, an amusement device (e.g., in inflatable "bounce house," etc.), a cargo cover or a covering.

FIG. 2 also shows example connectors 220, constructed in accordance with teachings of this disclosure, disposed at and connected to a periphery of the example flexible substrate 210. The connectors 220 in FIG. 2 include an example first connector 230 and an example second connector 240. The second connector 240 is disposed at and connected to a periphery of a side of the flexible substrate 210 and the first connector 230 is disposed at, and connected to, a periphery of a corner of the flexible substrate 210. In some examples, such as is partially shown in the example apparatus of FIG. 2, a plurality of the first connectors 230 are disposed at and connected to different side portions of a periphery of the flexible substrate 210 and a plurality of the second connectors 240 are disposed at and connected to different corners of the flexible substrate 210. For instance, the flexible substrate 210 (e.g., an example tarp 200, etc.) may include four, six, eight or more first connectors 230 disposed at, and connected to, different side portions of a periphery the flexible substrate 210 and/or may include four second connectors 240 disposed at, and connected to, corner portions at the periphery the flexible substrate 210. The number of first connectors 230 and second connectors 240 used for a particular apparatus may vary responsive to a size, material and/or an intended use of the flexible substrate 210. For instance, an example 10'×20' tarp may advantageously employ fourteen or more of the first connectors 230 and four of the second connectors 240, while an example 10'×10' tarp may employ eight of the first connectors 230 and four of the second connectors 240.

Figure 3:
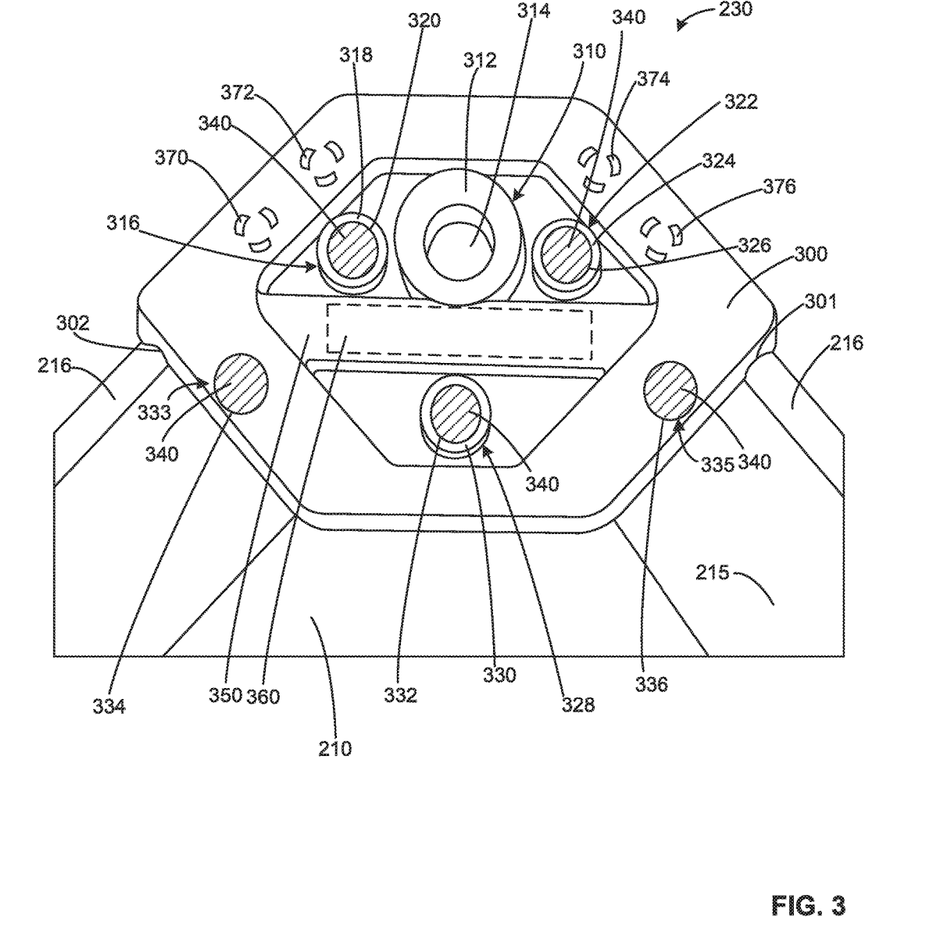
FIG. 3 is a schematic illustration of an example first connector, constructed in accordance with teachings of this disclosure, attached to a periphery of the flexible substrate of FIG. 2.

FIG. 3 shows the first connector 230 of FIG. 2 attached to a periphery of the tarp 200 of FIG. 2 at a corner of the tarp 200. The first connector 230 defines a generally hexagonal shape and includes an example raised edge portion 300. In other examples, the first connector 230 may include a different shape, such as a square, circle, oval, diamond, polygon, rhomboid or quadrilateral shape. The first connector 230 of FIG. 3 includes an example first cutout 301 and an example second cutout 302 corresponding in location and dimension to receive reinforced periphery 215 reinforcing material 216 (e.g., an integrated rope or cable, folded and doubled stitched edges, etc.) of the flexible substrate 210. In some examples, in which the first connector 230 is to be connected to a flexible substrate 210 that is substantially planar at a periphery of the flexible substrate 210, the first cutout 301 and the second cutout 302 may be omitted.

The first connector 230 includes an example grommet 310 that includes an example boss 312 or reinforced wall and defines an example through hole 314. The through hole 314 of the grommet 310 may receive, for example, a tensile member (e.g., a rope, cord, cable, strap, etc.) directly or indirectly via an intermediary fitting (e.g., a D-loop fitting, PVC coated steel hook, stainless steel hook, plastic hook, "S" hook, carabiner, etc.). While the through hole 314 in the grommet 310 is shown to be circular in cross-section, the through hole 314 may include other cross-sectional shapes (e.g., oval, polygonal, etc.).

Adjacent the example grommet 310 are an example first fastener receiver 316 including an example boss 318 or reinforced wall and defining an example through hole 320 and an example second fastener receiver 322 including an example boss 324 or reinforced wall and defining an example through hole 326. In another portion of the example first connector 230 are formed an example third fastener receiver 328 including an example boss 330 or reinforced wall and defining an example through hole 332, an example fourth fastener receiver 333 defining an example through hole 334 through the example raised edge portion 300, and an example fifth fastener receiver 335 defining an example through hole 336 through the example raised edge portion 300. Example mechanical fasteners 340 are disposed through each of the first fastener receiver 316, the second fastener receiver 322, the third fastener receiver 328, the fourth fastener receiver 333, and the fifth fastener receiver 335 to connect the first connector 230 to the flexible substrate 210. In some examples, the mechanical fasteners 340 include a rivet (e.g., a blind rivet, a semi-tubular rivet, a solid rivet, a drive rivet, etc.), a bolt or a pin.

FIG. 3 also shows that the first connector 230 defines an example channel 350 extending across the first connector 230. An example retainer 360 is disposed in the channel 350, as discussed below in FIGS. 4A-4B. The raised edge portion 300 also shows example punch out holes 370, 372, 374, 376 corresponding to male connectors formed via an example injection molding process on an interior of a second connector piece, discussed below in FIGS. 4A-4B. In some examples, the punch out holes 370, 372, 374, 376 are omitted.

Figure 4A:
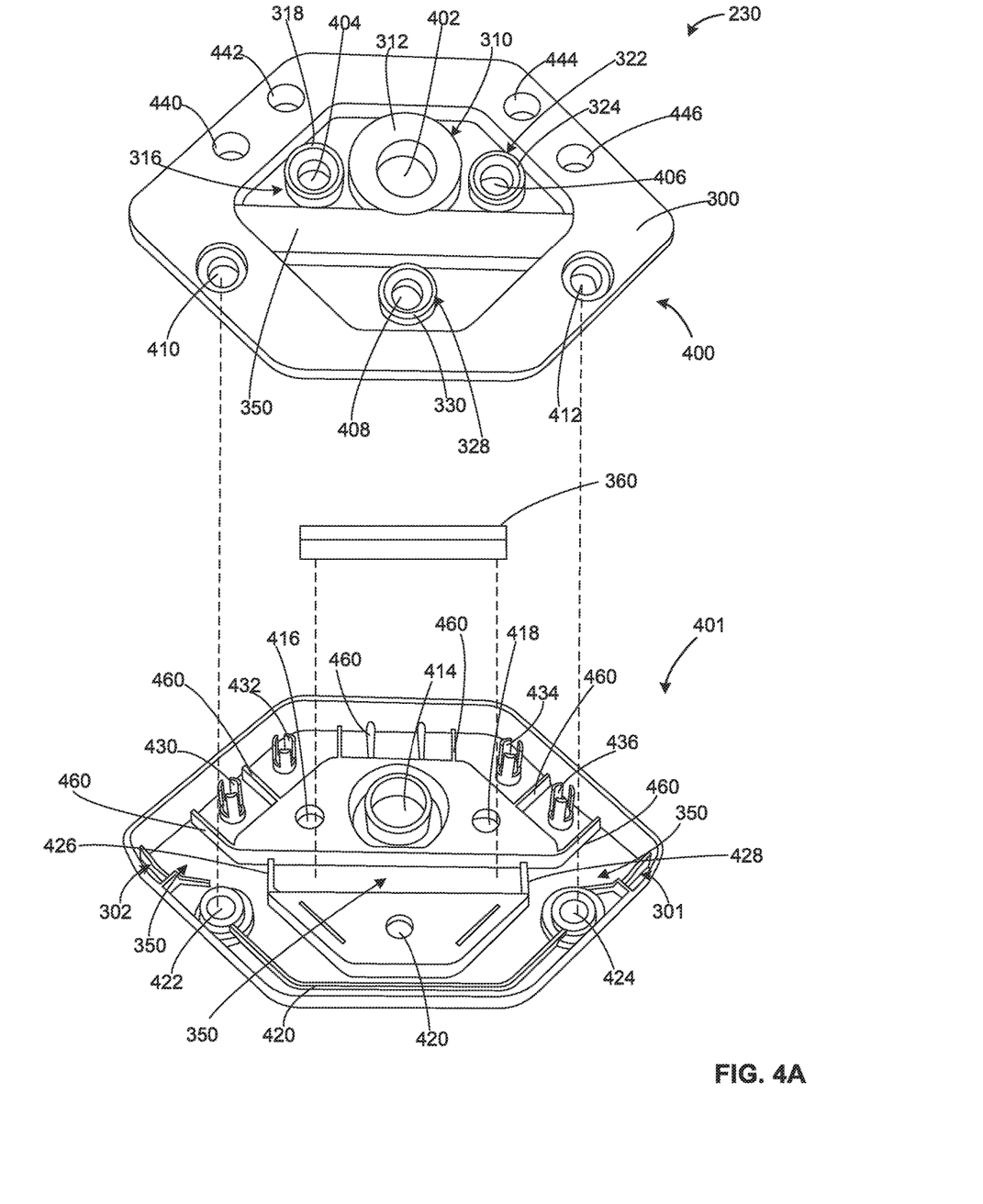
FIG. 4A is an exploded illustration of parts of the first connector of FIG. 3 prior to connection of the first connector to the flexible substrate of FIG. 2.

FIG. 4A shows an exploded illustration of example parts of the first connector 230 of FIG. 3 prior to connection of the first connector 230 to the tarp 200 of FIG. 2. The first connector 230 is shown to include an example first connector piece 400 and an example second connector piece 401 constructed to matingly connect with one another. In some examples, the first connector piece 400 and the second connector piece 401 are formed from a metal, a metal powder, an alloy or a polymer, such as a thermoplastic polymer or a thermosetting polymer, a high-density polyethylene (HDPE), polypropylene, and/or polyvinyl chloride. The first connector piece 400 and the second connector piece 401 are formed via a manufacturing process appropriate to the selected material(s) (e.g., injection molding, compression molding, 3-D printing, powder compaction via die pressing, etc.).

Figure 4B:
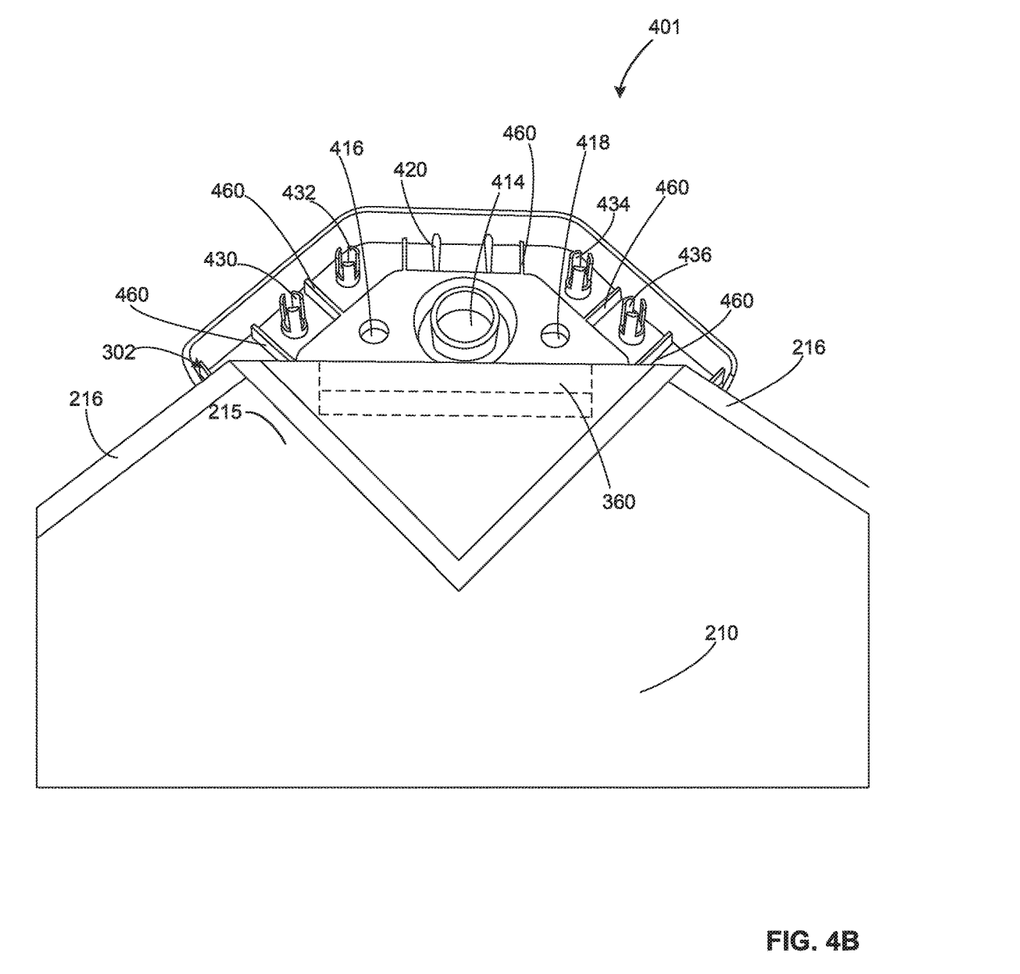
FIG. 4B is an illustration of an example intermediary stage of connection of an example second connection piece of FIG. 4A to the example flexible substrate, wherein a corner of the example flexible substrate of FIG. 2 is wrapped around an example retainer.

The first connector piece 400 includes a first plurality of example through holes 402, 404, 406, 408, 410 and 412. The second connector piece 401 includes a second plurality of example through holes 414, 416, 418, 420, 422 and 424. The second connector piece 401 is disposable in opposition to the first connector piece 400 to align the first plurality of through holes 402, 404, 406, 408, 410 and 412 and the second plurality of through holes 414, 416, 418, 420, 422 and 424 to define, via the first plurality of through holes 402, 404, 406, 408, 410 and 412 and the second plurality of through holes 414, 416, 418, 420, 422 and 424, the grommet through hole 314 and the plurality of fastener receivers 316, 322, 328, 333 and 335. FIGS. 4A-4B show that the channel 350 is defined at least in part by the first connector piece 400 and extends across the first connector piece 400. In some examples, the channel 350 is defined by the first connector piece 400 and the second connector piece 401 in combination and occupies an open space defined therebetween. In FIGS. 4A-4B, the channel 350 is shown to extend across the second connector 401 from the first cutout 301 to the second cutout 302, forming a pathway to accommodate a periphery of the flexible substrate 210, which may include a reinforced periphery 215, and more particularly to accommodate a periphery of the flexible substrate 210 that is at least partially folded over the retainer 360, such as is shown by way of example in FIG. 4B. In some examples, the channel 350 and/or the retainer 360 is omitted.

As shown in FIG. 3 and as indicated in FIG. 4A, the channel 350 is to receive the retainer 360, which is dimensioned to fit in the channel 350. In FIGS. 3 and 4A, the retainer 360 is shown to include a rectangular block that may be hollow, hollow with reinforcing ribs, or solid. In some examples, the retainer 360 includes other shapes such as, but not limited to a cylinder or a polygonal bar (e.g., a pentagonal bar, a hexagonal bar, etc.). In some examples, the retainer 360 is formed from the same material used to form the first connector piece 400 and the second connector piece 401. In some examples, the retainer 360 is formed from a different material that that used to form the first connector piece 400 and the second connector piece 401.

In the example of FIG. 4A, the first connector piece 400 and the second connector piece 401 are shown to be separate pieces. In some examples, the first connector piece 400 and the second connector piece 401 are formed as a single piece in a clamshell configuration wherein the first connector piece 400 and the second connector piece 401 are connected by a hinge. The hinge is naturally disposed at an end of the first connector 230 that is to reside outside of a physical extent of the flexible substrate 210. In some examples, the first connector piece 400 and the second connector piece 401 are separate pieces, such as shown in FIG. 4A, with each of the first connector piece 400 and the second connector piece 401 including knuckles constructed to interlock with one another and to receive a pin inserted along an axial direction.

Included in the channel 350 are a first limiter 426 to limit lateral movement of the retainer 360 in a first direction and a second limiter 428 to limit lateral movement of the retainer 360 in a second direction. The first limiter 426 and/or the second limiter 428 may be formed on the first connector piece 400 and/or the second connector piece 401. In the example of FIG. 4A, the first limiter 426 and the second limiter 428 are formed on the second connector piece 401. While the first limiter 426 and the second limiter 428 are represented as walls, the first limiter 426 and the second limiter 428 may include other configurations such as, but not limited to, a post or a protuberance extending into the channel 350.

FIG. 4A shows that the second connector piece 401 includes example male connectors 430, 432, 434, 436 disposed adjacent a periphery of one side of the second connector piece 401 in positions corresponding to example mating female connectors 440, 442, 444, 446 formed in the first connector piece 400 adjacent a periphery of a corresponding side of the first connector piece 400. While four male connectors 430, 432, 434, 436 and four female connectors 440, 442, 444, 446 are depicted in FIGS. 3 and 4A, a greater number or a lesser number of male connectors and/or female connectors may be used. In some examples, one or more of, or all of, the male connectors 430, 432, 434, 436 and four female connectors 440, 442, 444, 446 are omitted. While an example of male connectors and female connectors are represented in FIG. 4A, other types of male connectors and female connectors may be used including, but not limited to, receptacles or indentations and bosses or protrusions. In some examples, such as in the example of FIGS. 4A-4B, one or more the male connectors 430, 432, 434, 436 connect to one or more the female connectors 440, 442, 444, 446 without passing through the flexible substrate 210.

In some examples, peripheral portions or edges of the first connector piece 400 and the second connector piece 401 include male and female elements, or friction fit elements, that engage one another to facilitate connection between the first connector piece 400 and the second connector piece 401. In some examples, instead of using male connectors (e.g., 430, 432, 434, 436) and female connectors (e.g., 440, 442, 444, 446), the first connector piece 400 and the second connector piece 401 may be bonded together via an adhesive or welded (e.g., ultrasonic welding, hot gas welding, etc.) together at abutting portions that are disposed externally beyond the periphery (e.g., the reinforced periphery 215) of the flexible substrate 210.

As shown in FIG. 3 and FIG. 4A, the first connector 230 includes fastener receivers (e.g., 316, 322) on a first side of the channel 350 and includes fastener receivers (e.g., 328, 333, 335) on a second side of the channel 350. A greater number, or a lesser number (e.g., one, two, three, four), of fastener receivers may be used in accord with the teachings herein. The fastener receivers 316, 322, 328, 333, 335 distribute forces acting upon the grommet 310 over a larger surface area of the flexible substrate 210 that conventional grommet configurations that focus forces onto a small portion of the flexible substrate 210. FIG. 4A also shows example reinforcing structures 460 (e.g., reinforcing ribs, etc.) distributed about the second connection piece 401. Alternate configurations of reinforcing structures 460 may be used in the first connection piece 400 and/or the second connection piece 401 to impact a desired structural stiffness to satisfy a respective design envelope.

FIG. 4B shows an example intermediary stage of connection of the example second connector 401 of FIG. 4A to the flexible substrate 210, wherein an example corner of the flexible substrate 210 of FIGS. 2-3 is wrapped around the retainer 360. In other examples, the corner of the flexible substrate 210 is only partially wrapped around the retainer 360. For instance, the corner of the flexible substrate 210 may contact only 3 sides of the retainer 360, or may contact less than seventy-five percent of the periphery of the retainer 360. The retainer 360 and corresponding portion of the flexible substrate 210 are then disposed in the channel 350, wherein movement of the retainer 360 is constrained laterally by the first limiter 426 and the second limiter 428. When assembled with the first connector piece 400 and insertion of the mechanical fasteners 340 in the first fastener receiver 316, the second fastener receiver 322, the third fastener receiver 328, the fourth fastener receiver 333 and the fifth fastener receiver 335 to connect the first connector piece 400, the second connector piece 401, and the flexible substrate 210, the retainer 360 helps to anchor the flexible substrate 210 in place and resist tear out of the first connector 230.

Following the example intermediary stage of connection of the example second connector 401 of FIG. 4A to the flexible substrate 210 shown in FIG. 4B, holes may optionally be formed in the flexible substrate 210 at positions corresponding to the through holes 420, 422, 424 disposed beneath the flexible substrate 210. In some examples, the corner portion of the flexible substrate 210 may be cut, trimmed, folded or modified, before or after the intermediary stage represented in FIG. 4B, to conform to an interior geometry of the first connector 230 realized by connection of the first connection piece 400 to the second connection piece 401 to form the first connector 230.

Figure 5:
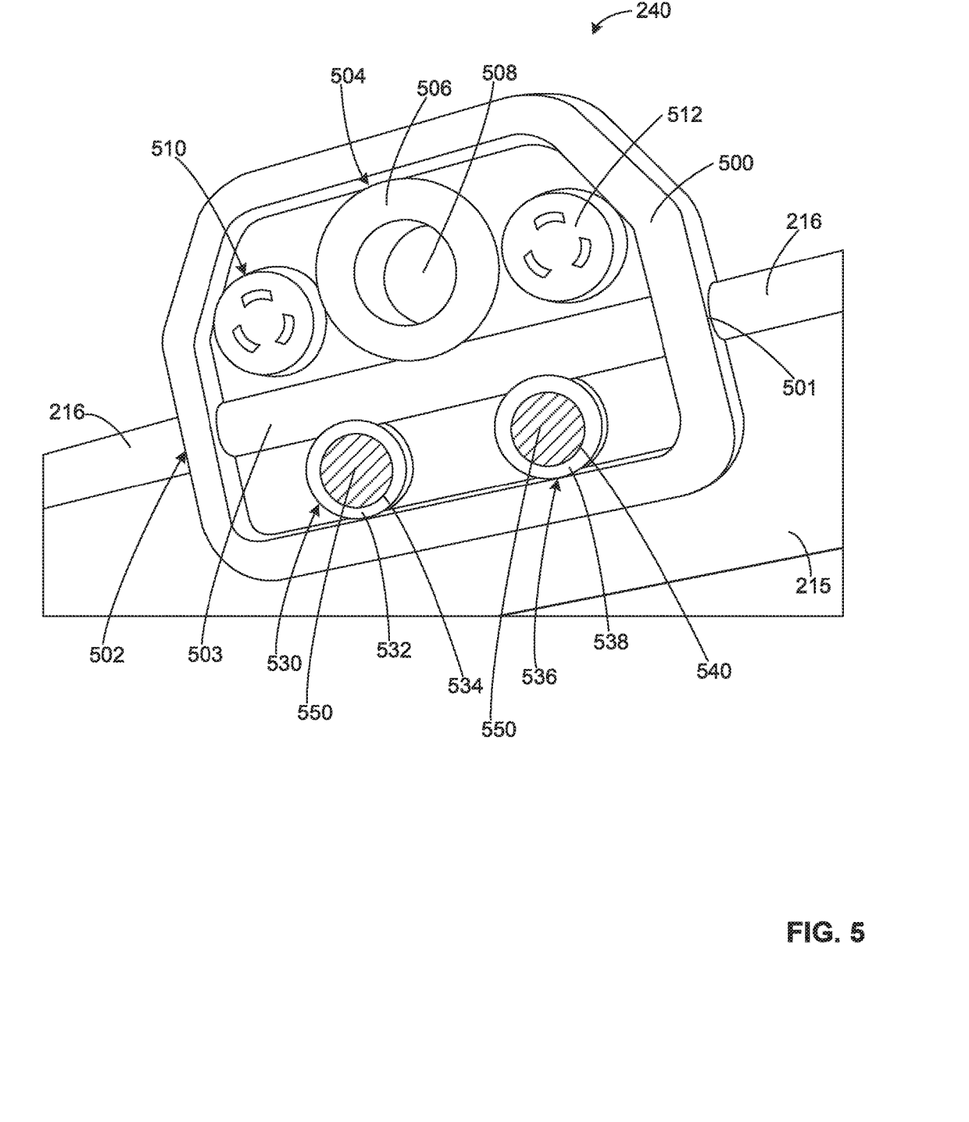
FIG. 5 is a schematic illustration of an example second connector, constructed in accordance with teachings of this disclosure, attached to a periphery the flexible substrate of FIG. 2.

FIG. 5 shows the second connector 240 of FIG. 2 attached to a periphery the flexible substrate 210 along a side of the flexible substrate 210. The second connector 240 defines a generally square or rectangular shape and includes an example raised edge portion 500. In other examples, the second connector 240 may include a different shape, such as a square, circle, oval, polygon, diamond, rhomboid or quadrilateral shape. The second connector 240 of FIG. 5 includes an example first cutout 501 and an example second cutout 502 corresponding in location and dimension to receive reinforced periphery 215 material (e.g., an integrated rope or cable, folded and doubled stitched edges, etc.) of the flexible substrate 210. The reinforced periphery 215 extends across the second connector 240 through the first cutout 501 and the second cutout 502 via an example channel 503 defined in the second connector 240 to extend across the second connector 240 from the first cutout 501 to the second cutout 502. In some examples, where the second connector 240 is to be connected to a flexible substrate 210 that is substantially planar at a periphery of the flexible substrate 210, the first cutout 501 and the second cutout 502 may be omitted.

The second connector 240 includes an example grommet 504 that includes an example boss 506 or reinforced wall and defines an example through hole 508. The through hole 508 of the grommet 504 may receive, for example, a tensile member (e.g., a rope, cord, cable, strap, etc.) directly or indirectly via an intermediary fitting (e.g., a D-loop fitting, PVC coated steel hook, stainless steel hook, plastic hook, "S" hook, carabiner, etc.). While the through hole 508 in the grommet 504 is shown to be circular in cross-section, the through hole 508 may include other cross-sectional shapes (e.g., oval, polygonal, etc.). Adjacent the example grommet 504 are an example first female connector 510 and an example second female connector 512. The grommet 504, the first female connector 510 and the second female connector 512 are all disposed on a first side of the channel 503 defined in the second connector 240 to extend across the second connector 240.

On a second side of the channel 503 is a first fastener receiver 530 including an example boss 532 or reinforced wall and defining an example through hole 534 and an example second fastener receiver 536 including an example boss 538 or reinforced wall and defining an example through hole 540. Example mechanical fasteners 550 are disposed through each of the first fastener receiver 530 and the second fastener receiver 536 to connect the second connector 240 to the flexible substrate 210. In some examples, the mechanical fasteners 550 include a rivet (e.g., a blind rivet, a semi-tubular rivet, a solid rivet, a drive rivet, etc.), a bolt or a pin.

Figure 6:
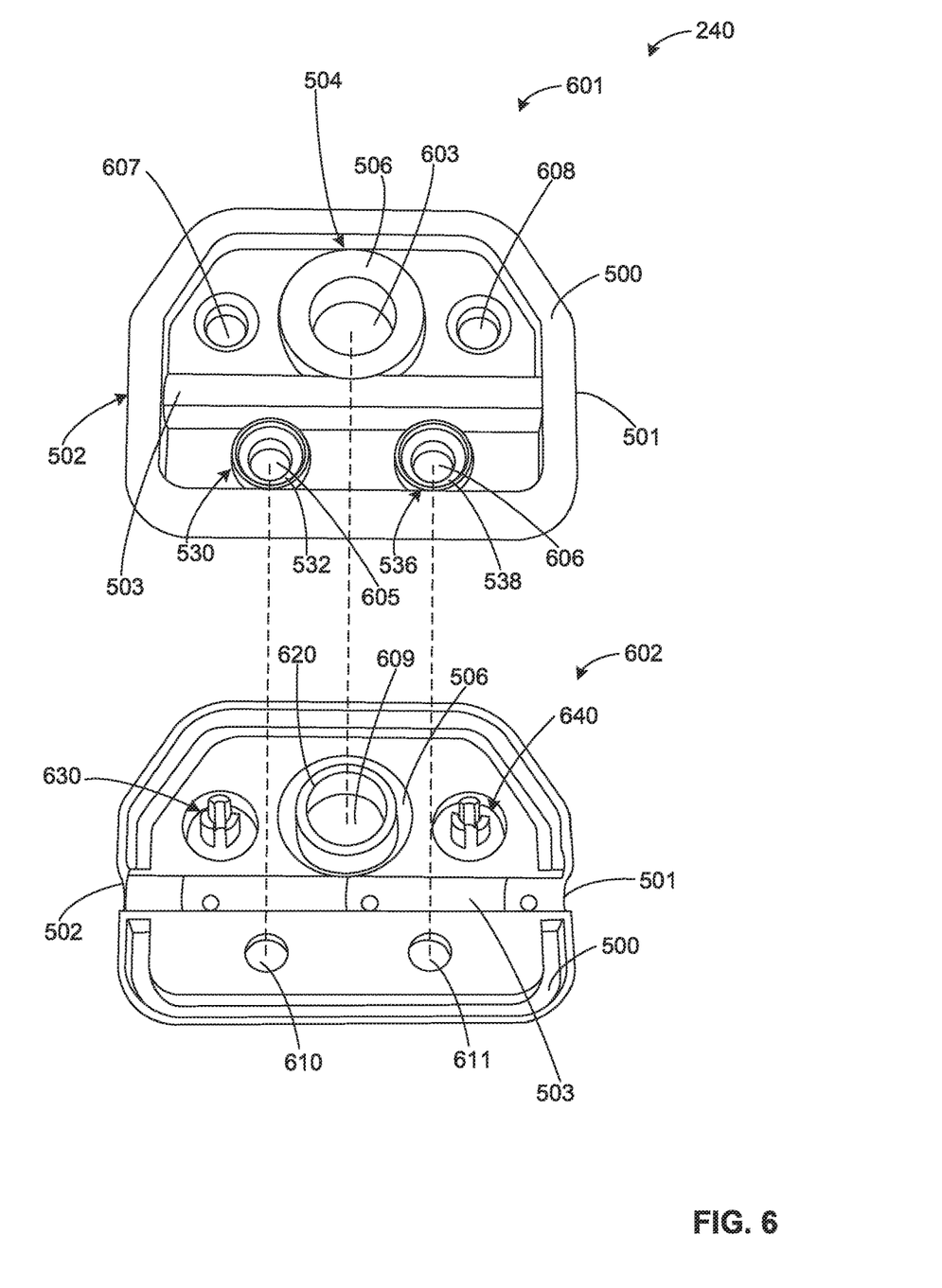
FIG. 6 is an exploded illustration of parts of the second connector of FIG. 5 prior to connection of the second connector to the flexible substrate of FIG. 2.

FIG. 6 shows an exploded illustration of example parts of the second connector 240 of FIG. 2 prior to connection of the second connector 240 to the tarp 200 of FIG. 2. The second connector 240 is shown to include an example first connector piece 601 and an example second connector piece 602 constructed to matingly connect with one another. In some examples, the first connector piece 601 and the second connector piece 602 are formed from a metal, a metal powder, an alloy or a polymer, such as a thermoplastic polymer or a thermosetting polymer, a high-density polyethylene (HDPE), polypropylene, and/or polyvinyl chloride. The first connector piece 601 and the second connector piece 602 are formed via a manufacturing process appropriate to the selected material(s) (e.g., injection molding, compression molding, 3-D printing, powder compaction via die pressing, etc.).

The first connector piece 601 defines a first plurality of example through holes 603, 605, 606, in addition to example female connectors, 607 and 608, which may or may not include through holes. The second connector piece 602 defines a second plurality of example through holes 609, 610 and 611. The second connector piece 602 also defines an example annular member 620 configured as a male annulus dimensioned for insertion into the boss 506 of the grommet 504. The second connector piece 602 is disposable in opposition to the first connector piece 601 to align the first plurality of through holes 603, 605 and 606 with corresponding ones of the second plurality of through holes 609, 610 and 611 to define the grommet 504 through hole 508, the first fastener receiver 530 and the second fastener receiver 536. FIG. 6 shows that the channel 503 is defined at least in part by the first connector piece 601. In some examples, the channel 503 is defined by the first connector piece 601 and the second connector piece 602 in combination and occupies an open space defined therebetween. In FIG. 6, the channel 503 is shown to extend across the second connector 602 from the first cutout 501 to the second cutout 502, forming a pathway to accommodate a periphery of the flexible substrate 210, which may include a reinforced periphery 215. Whereas the first connector 230 of FIG. 4B shows an example where the flexible substrate 210 is at least partially folded over a retainer 360, the second connector 240 of FIGS. 5-6 does not use a retainer and, instead, the channel 503 receives the reinforced periphery 215 of the flexible substrate 210. In some examples, the channel 350 and/or the retainer 360 is omitted.

In the example of FIG. 6, the first connector piece 601 and the second connector piece 602 are shown to be separate pieces. In some examples, the first connector piece 601 and the second connector piece 602 are formed as a single piece in a clamshell configuration wherein the first connector piece 601 and the second connector piece 602 are connected by a hinge. The hinge is naturally disposed at an end of the first connector 230 that is to reside outside of a physical extent of the flexible substrate 210. In some examples, the first connector piece 601 and the second connector piece 602 are separate pieces, such as shown in FIG. 6, with each of the first connector piece 601 and the second connector piece 602 including knuckles constructed to interlock with one another and to receive a pin inserted along an axial direction.

FIG. 6 shows that the second connector piece 602 includes example male connectors 630, 640 disposed adjacent a periphery of the second side of the channel 503 of the first connector piece 601 in positions corresponding to the mating female connectors, 608 formed in the first connector piece 601 adjacent a periphery of a corresponding side of the first connector piece 601. The female connectors 607, 608 may include through holes, as shown in FIG. 6, or may include receptacles formed internally to the first connector piece 601. While two male connectors 630, 640 and two female connectors 607, 608 are depicted in FIG. 6, a greater number or a lesser number of male connectors and/or female connectors may be used. In some examples, the second connector includes no male and female connectors or may include one or more male connectors and female connectors. While an example of male connectors and female connectors are represented in FIG. 6, other types of male connectors and female connectors may be used including, but not limited to, receptacles or indentations and bosses or protrusions. In some examples, such as in the example of FIGS. 5-6, one or more the male connectors 630, 640 connect to one or more the female connectors 607, 608 without passing through the flexible substrate 210.

In some examples, peripheral portions or edges of the first connector piece 601 and the second connector piece 602 include male and female elements, or friction fit elements, that engage one another to facilitate connection between the first connector piece 601 and the second connector piece 602. In some examples, instead of using male connectors (e.g., 630, 640) and female connectors (e.g., 607, 608), the first connector piece 601 and the second connector piece 602 may be bonded together via an adhesive or welded (e.g., ultrasonic welding, hot gas welding, etc.) together at abutting portions that are disposed externally beyond the periphery (e.g., the reinforced periphery 215) of the flexible substrate 210.

As shown in FIG. 5 and FIG. 6, the second connector 240 includes fastener receivers (e.g., 530, 536) on a second side of the channel 503. A greater number, or a lesser number (e.g., one, three, etc.), of fastener receivers may be used in accord with the teachings herein. The fastener receivers 530, 536 distribute forces acting upon the grommet 504 over a larger surface area of the flexible substrate 210 that conventional grommet configurations that focus forces onto a small portion of the flexible substrate 210.

Figure 7:
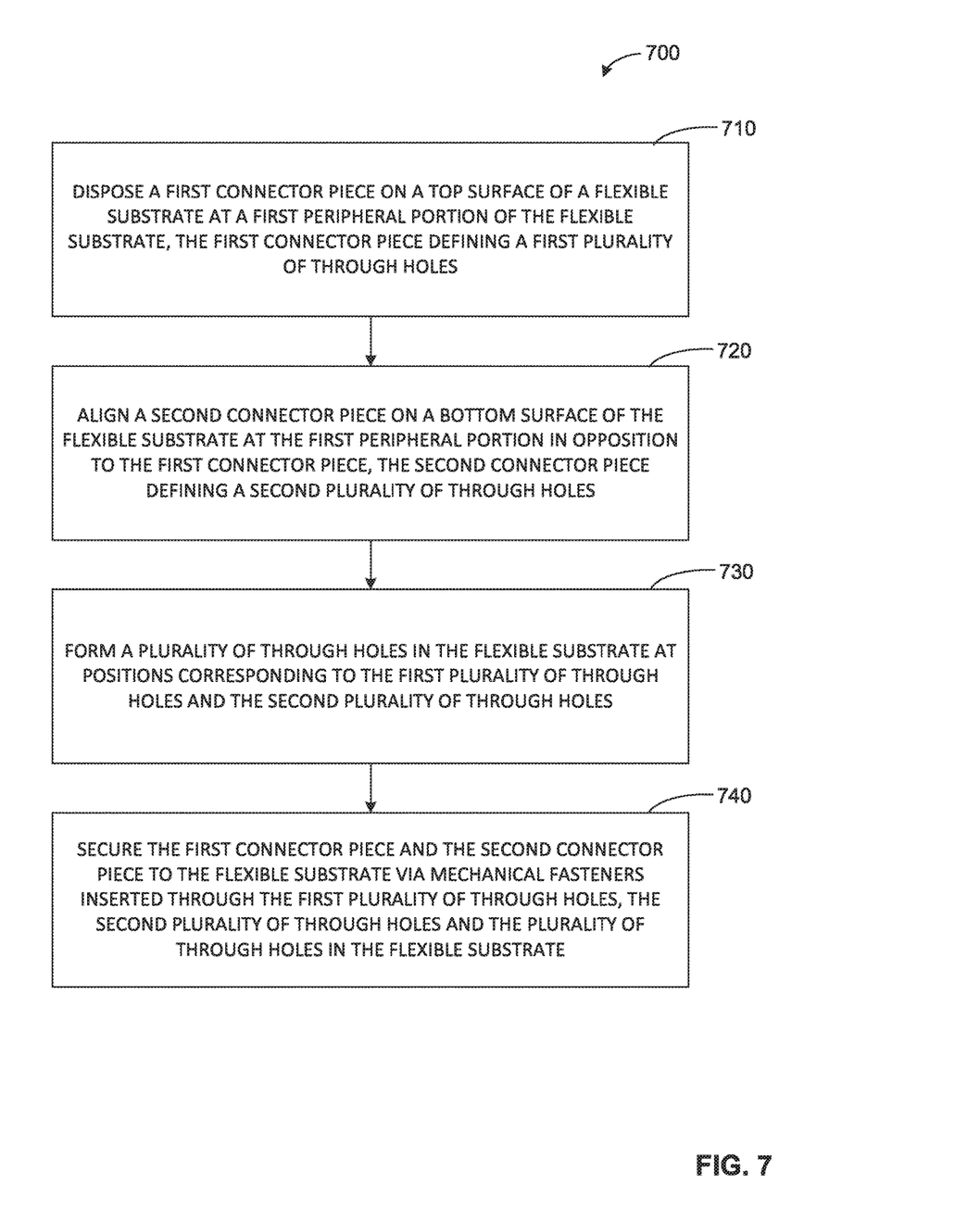
FIG. 7 is a flowchart representative of steps to implement the example connectors disclosed herein in accordance with teachings of this disclosure.

A flowchart representative of example instructions, such as but not limited to machine readable instructions, for forming the first connector 230 and the second connector 240 of FIGS. 2-6 is shown in FIG. 7. In some examples, the instructions comprise a program for execution by a processor implemented by hardware including one or more integrated circuits, logic circuits, microprocessors or controllers from any desired family or manufacturer. The hardware processor may be a semiconductor based (e.g., silicon based) device. The program may be embodied in software stored on a non-transitory computer readable storage medium such as a CD-ROM, a floppy disk, a hard drive, a digital versatile disk (DVD), a Blu-ray disk, or a memory associated with the processor, but the entire program and/or parts thereof could alternatively be executed by a device other than the processor and/or embodied in firmware or dedicated hardware. The processor includes a local memory (e.g., a cache) and communicates with a main memory including a volatile memory and a non-volatile memory via a bus. The volatile memory may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory may be implemented by flash memory and/or any other desired type of memory device. Access to the main memory is controlled by a memory controller.

Further, although the example program is described with reference to the flowchart illustrated in FIG. 7, many other methods of implementing the example first connector 230 and the second connector 240 of FIGS. 2-6 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

A processor platform (e.g., a server, a personal computer, a machine, industrial equipment, a mobile device (e.g., a cell phone, a smart phone, a tablet device, etc.) utilizing the processor includes an interface circuit implemented by any type of interface standard, such as an Ethernet interface, a universal serial bus (USB), and/or a PCI express interface. One or more input devices are connected to the interface circuit to permit a user to enter data and/or commands into the processor. The input device(s) can be implemented by, for example, an audio sensor, a microphone, a camera (still or video), a keyboard, a button, a mouse, a touchscreen, a track-pad, a trackball, isopoint and/or a voice recognition system. One or more output devices are also connected to the interface circuit and include, for example, display devices (e.g., a light emitting diode (LED), an organic light emitting diode (OLED), a liquid crystal display, a cathode ray tube display (CRT), a touchscreen, a tactile output device, a printer and/or speakers). The interface circuit may also include a graphics driver card, a graphics driver chip and/or a graphics driver processor. The interface circuit may also include a communication device such as a transmitter, a receiver, a transceiver, a modem and/or network interface card to facilitate exchange of data with external machines (e.g., computing devices of any kind) via a network (e.g., an Ethernet connection, a digital subscriber line (DSL), a telephone line, coaxial cable, a cellular telephone system, etc.).

The processor platform also includes one or more mass storage devices for storing software and/or data. Examples of such mass storage devices include floppy disk drives, hard drive disks, compact disk drives, Blu-ray disk drives, RAID systems, and digital versatile disk (DVD) drives. Coded instructions, such as the instructions of FIG. 7, may be stored in the mass storage device, in the volatile memory, in the non-volatile memory, and/or on a removable tangible computer readable storage medium such as a CD or DVD. The example processes of FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The instructions 700 of FIG. 7 concerning a method of forming a connector (e.g., the first connector 230, the second connector 240, etc.) for a flexible substrate 210, may be implemented manually or via one or more processor-controlled machines.

Block 710 includes disposing a first connector piece (e.g., 601) on a top surface of a flexible substrate 210 at a first peripheral portion of the flexible substrate 210 (e.g., a predetermined position at a side of the flexible substrate, etc.), the first connector piece 601 defining a first plurality of through holes 603, 605 and 606.

At block 720, a second connector piece (e.g., 602) is aligned on a bottom surface of the flexible substrate 210 at the first peripheral portion in opposition to the first connector piece 601, the second connector piece 602 defining a second plurality of through holes 609, 610 and 611.

At block 730, a plurality of through holes are formed in the flexible substrate 210 at positions corresponding to the first plurality of through holes 603, 605 and 606 and the second plurality of through holes 609, 610 and 611. In some examples, the plurality of through holes are formed in the flexible substrate 210 following and alignment of the first connector piece 601 and the second connector piece 602 or following an initial connection of the first connector piece 601 and the second connector piece 602 via the male/female connector(s) (e.g., 607, 608, 630, 640). For instance, following connection of the first connector piece 601 and the second connector piece 602, a drill bit or a punch is inserted through the through holes 534, 540 of the second connector 240 and passed through the flexible substrate 210. In some examples, the plurality of through holes are formed in the flexible substrate 210 prior to assembly of the flexible substrate 210 with the first connector piece 601 and the second connector piece 602.

At block 740, the first connector piece 601 and the second connector piece 602 are secured to the flexible substrate 210 via mechanical fasteners (e.g., 550) inserted through the first plurality of through holes (e.g., 605, 610), the second plurality of through holes (e.g., 606, 611) and the plurality of through holes in the flexible substrate.

The instructions above in blocks 710-740 are also applicable to the connection of the first connector 230 to the flexible substrate 210.

In some examples, additional instructions are performed. For instance, the connection of the first connector piece 400 and the second connector piece 401 includes positioning of the retainer 360 on the flexible substrate 210 and within the channel 350 prior to the forming of the plurality of through holes in the flexible substrate 210 at block 730 or prior to the securing of the first connector piece 400 and the second connector piece 401 to the flexible substrate 210 via mechanical fasteners 340 at block 740. In some examples, following positioning of the retainer 360 on the flexible substrate 210 and within the channel 350, the flexible substrate 210 is folded over the retainer 360 prior to the forming of the plurality of through holes in the flexible substrate 210 at block 730 or prior to the securing of the first connector piece 400 and the second connector piece 401 to the flexible substrate 210 via mechanical fasteners 340 at block 740.

In some examples, blocks 710-740 are repeated to connect a plurality of connectors 220 to the flexible substrate 210, such as is shown by way of example in FIG. 2. For example, a first connector (e.g., 230, 240, etc.) is disposed at a first position at a periphery 215 of the flexible substrate 210, a second connector (e.g., 230, 240, etc.) is disposed at a second position at a periphery 215 of the flexible substrate 210, a third connector (e.g., 230, 240, etc.) is disposed at a third position at a periphery of the flexible substrate, and a fourth connector (e.g., 230, 240, etc.) is disposed at a fourth position at a periphery of the flexible substrate. The apparatus of claim 15, further including a fifth connector disposed at a fifth position at a periphery of the flexible substrate, a sixth connector disposed at a sixth position at a periphery of the flexible substrate, a seventh connector disposed at a seventh position at a periphery of the flexible substrate, and an eighth connector is disposed at an eighth position at a periphery of the flexible substrate. In some examples, the first through fourth positions noted above may represent four corners of a square or rectangular flexible substrate 210 and the fifth through eighth positions noted above may represent four middle portions of the four sides of a square or rectangular flexible substrate 210.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A connector for a flexible substrate, comprising:
a first connector piece including a first plurality of through holes;
a second connector piece including a second plurality of through holes, the second connector piece disposable in opposition to the first connector piece to align the first plurality of through holes and the second plurality of through holes to define, via the first plurality of through holes and the second plurality of through holes, a grommet, a plurality of first fastener receivers and a plurality of second fastener receivers; and
a channel, defined at least in part by the first connector piece, extending across the first connector piece,
wherein the plurality of first fastener receivers are disposed on a first side of the channel and the plurality of second fastener receivers are disposed on a second side of the channel,
wherein the first side of the channel corresponds to a position at which a flexible substrate is disposable between the first connector piece and the second connector piece, and
wherein the second side of the channel corresponds to a position at which a flexible substrate is not disposed between the first connector piece and the second connector piece.

2. The connector of claim 1, wherein the first connector piece and the second connector piece are separate pieces.

3. The connector of claim 1, wherein the first connector piece and the second connector piece are connected by a hinge.

4. The connector of claim 1, further including a retainer dimensioned to fit in the channel.

5. The connector of claim 4, wherein the channel includes a first limiter to limit lateral movement of the retainer in a first direction and a second limiter to limit lateral movement of the retainer in a second direction.

6. The connector of claim 1, wherein the second connector piece includes a male connector disposed adjacent a periphery of the second connector piece and the first connector piece includes a female connector disposed adjacent a periphery of the first connector piece.

7. The connector of claim 1, wherein at least one of the grommet or the plurality of fastener receivers includes a boss or a reinforced wall.

8. The connector of claim 1, wherein at least some of the plurality of fastener receivers are disposed on a first side of the channel and at least some of the plurality of fastener receivers are disposed on a second side of the channel.

9. The connector of claim 1, wherein the grommet is formed on the second side of the channel and the plurality of fastener receivers includes at least a first fastener receiver and a second fastener receiver disposed on the first side of the channel.

10. An apparatus, comprising:
a flexible substrate;
a connector including a first connector piece defining a first plurality of through holes and a second connector piece defining a second plurality of through holes, the first connector piece defining a channel extending across the first connector piece; and
a plurality of mechanical fasteners connecting the connector to the flexible substrate,
wherein the first connector piece is disposed adjacent a top surface of the flexible substrate at a periphery of the flexible substrate and the second connector piece is disposed adjacent a bottom surface of the flexible substrate adjacent the periphery of the flexible substrate and in opposition to the first connector piece to align the first plurality of through holes and the second plurality of through holes to define a grommet, a plurality of first fastener receivers and a plurality of second fastener receivers, the plurality of mechanical fasteners being inserted through the fastener receivers and through the flexible substrate to connect the first connector piece, the second connector piece, and the flexible substrate,
wherein the plurality of first fastener receivers are disposed on a first side of the channel and the plurality of second fastener receivers are disposed on a second side of the channel,
wherein the first side of the channel corresponds to a position at which a flexible substrate is disposable between the first connector piece and the second connector piece, and
wherein the second side of the channel corresponds to a position at which a flexible substrate is not disposed between the first connector piece and the second connector piece.

11. The apparatus of claim 10, wherein the first connector piece and the second connector piece of the connector define a channel between the first connector piece and the second connector piece, and wherein the periphery of the flexible substrate is at least partially retained within the channel.

12. The apparatus of claim 11, wherein the periphery of the flexible substrate includes a reinforced periphery and wherein a portion of the reinforced periphery is retained within the channel.

13. The apparatus of claim 11, wherein the periphery of the flexible substrate is folded over a retainer dimensioned to fit within the channel.

14. The apparatus of claim 10, wherein the first connector piece or the second connector piece includes a male connector, wherein another one of the first connector piece or the second connector piece includes a female connector and wherein the male connector connects to the female connector without passing through the flexible substrate.

15. The apparatus of claim 10, wherein the connector includes a plurality of connectors, with a first connector disposed at a first position at a periphery of the flexible substrate, a second connector disposed at a second position at a periphery of the flexible substrate, a third connector disposed at a third position at a periphery of the flexible substrate, and a fourth connector disposed at a fourth position at a periphery of the flexible substrate.

16. The apparatus of claim 15, further including a fifth connector disposed at a fifth position at a periphery of the flexible substrate, a sixth connector disposed at a sixth position at a periphery of the flexible substrate, a seventh connector disposed at a seventh position at a periphery of the flexible substrate, and an eighth connector is disposed at an eighth position at a periphery of the flexible substrate.

17. The apparatus of claim 10, wherein the flexible substrate includes at least one of canvas, ripstop canvas, polyethylene, polyester, polyester coated with polyurethane, polyester oxford, nylon, nylon 6, nylon 66, nylon coated with polyurethane, ripstop nylon, ripstop fabric, polyvinylchloride, or vinyl.

18. The apparatus of claim 17, wherein the flexible substrate includes a tarp, a covering, a tent, a hammock, luggage, a duffle bag, an amusement device, a parachute, a cargo cover or a covering.

19. The apparatus of claim 10, wherein the mechanical fasteners include at least one of a rivet, a bolt or a pin.

20. A method of forming a connector for a flexible substrate, comprising:

disposing a first connector piece defining, at least in part, a channel extending across the first connector piece, a first plurality of through holes on a first side of the channel, and a second plurality of through holes on a second side of the channel, on a first side of a flexible substrate at a first peripheral portion of the flexible substrate;

aligning a second connector piece defining a third plurality of through holes and a fourth plurality of through holes on a second side of the flexible substrate at the first peripheral portion in opposition to the first connector piece so that the third plurality of through holes are aligned with the first plurality of through holes and the fourth plurality of through holes are aligned with the second plurality of through holes;

disposing the flexible substrate between the first connector piece and the second connector piece so that a reinforced periphery of the flexible substrate within the channel, the flexible substrate is disposed between the fourth plurality of through holes and the second plurality of through holes, and the flexible substrate is not disposed between the third plurality of through holes and the first plurality of through holes;

securing a fastener receiver through at least one of the aligned third plurality of through holes and the first plurality of through holes to secure together the first connector piece and the second connector piece; and securing a fastener receiver through each of the aligned fourth plurality of through holes and the second plurality of through holes, and through the flexible substrate disposed therebetween, to secure together the first connector piece, the second connector piece and the flexible substrate.

\* \* \* \* \*